United States Patent
Homola

(10) Patent No.: US 9,579,731 B2
(45) Date of Patent: Feb. 28, 2017

(54) DRILL CHUCK ASSEMBLY

(71) Applicant: Kaarle Homola, Ridgefield, WA (US)

(72) Inventor: Kaarle Homola, Ridgefield, WA (US)

( * ) Notice: Subject to any disclaimer, the term of this patent is extended or adjusted under 35 U.S.C. 154(b) by 0 days.

(21) Appl. No.: 15/223,935

(22) Filed: Jul. 29, 2016

(65) Prior Publication Data

US 2016/0346845 A1 Dec. 1, 2016

Related U.S. Application Data

(60) Provisional application No. 62/198,324, filed on Jul. 29, 2015.

(51) Int. Cl.
  *B23B 31/22* (2006.01)
  *B23B 31/107* (2006.01)
  *B23B 31/20* (2006.01)

(52) U.S. Cl.
  CPC .......... *B23B 31/22* (2013.01); *B23B 31/1071* (2013.01); *B23B 31/208* (2013.01);
  (Continued)

(58) Field of Classification Search
  CPC .. B23B 31/1071; B23B 31/22; B23B 2260/12; B23B 2231/0224; B23B 2231/022; B23B 2231/0232; B23B 31/11; B23B 31/208; B23B 31/1074; Y10T 279/17145; Y10T 279/17752; Y10T 279/3406; Y10S 279/905
  See application file for complete search history.

(56) References Cited

U.S. PATENT DOCUMENTS 3,251,605 A * 5/1966 Ondeck ............... B23B 31/1071
  279/75
3,905,609 A * 9/1975 Sussman ............... B23B 31/001
  279/157
(Continued)

FOREIGN PATENT DOCUMENTS

JP       EP 0618030 A1 * 10/1994 ........... B23B 31/202

*Primary Examiner* — Eric A Gates
*Assistant Examiner* — Chwen-Wei Su
(74) *Attorney, Agent, or Firm* — Global Intellectual Property Agency, LLC; Daniel Boudwin

(57) ABSTRACT

A drill chuck assembly. The drill chuck assembly includes a rapid change mechanism configured to retain a drill bit shank inserted therein. The drill chuck assembly includes a body having a bore with a trilobe cross-section that is configured to receive a triangular and hexagonally shaped drill bit shank, interchangeably. The bore includes a slot positioned in each lobe that slidably contains a detent ball therein. A collar is affixed annularly around the body and defines a channel extending around the body. A sleeve is slidably mounted around the body. The sleeve includes a tapered end that is slidably disposed within the channel and has circular apertures that are in communication with the slots of the bore for reception of the detent balls. The sleeve is spring biased towards the collar, which forces the detent balls against an angular wall within the channel. The angular wall in turn forces the detent balls laterally towards a center of the bore, thereby exerting a force on a drill bit shank inserted into the bore and preventing the withdrawal of the shank from the bore. When the bias force of the sleeve is counteracted by sliding the sleeve about its longitudinal axis, the detent balls move outwardly along the angular wall, thereby relieving the force exerted onto the shank by the wall and allowing the shank to be withdrawn.

7 Claims, 7 Drawing Sheets

(52) U.S. Cl.
CPC ... *B23B 2231/0224* (2013.01); *B23B 2260/12* (2013.01); *Y10S 279/905* (2013.01); *Y10T 279/17145* (2015.01); *Y10T 279/17752* (2015.01)

(56) References Cited

U.S. PATENT DOCUMENTS

| | | | | |
|---|---|---|---|---|
| 4,094,523 | A | | 6/1978 | Derbyshire |
| 4,795,291 | A | * | 1/1989 | March ................ B23B 31/1074 279/156 |
| 5,409,333 | A | * | 4/1995 | Hu ....................... B25B 21/007 279/14 |
| 6,135,461 | A | * | 10/2000 | Below .................. B25D 17/088 279/19.4 |
| 6,474,656 | B1 | * | 11/2002 | Thomas .............. B23B 31/1071 279/30 |
| 6,502,836 | B1 | | 1/2003 | Marriott |
| 6,561,523 | B1 | | 5/2003 | Wienhold |
| 6,648,563 | B2 | | 11/2003 | Röhm |
| 8,328,205 | B2 | | 12/2012 | Bordeianu et al. |
| 2002/0109306 | A1 | * | 8/2002 | Huggins ............. B23B 31/1238 279/24 |
| 2008/0224427 | A1 | | 9/2008 | Schwarz et al. |
| 2013/0320637 | A1 | * | 12/2013 | Zhang .................... B23B 31/06 279/112 |

* cited by examiner

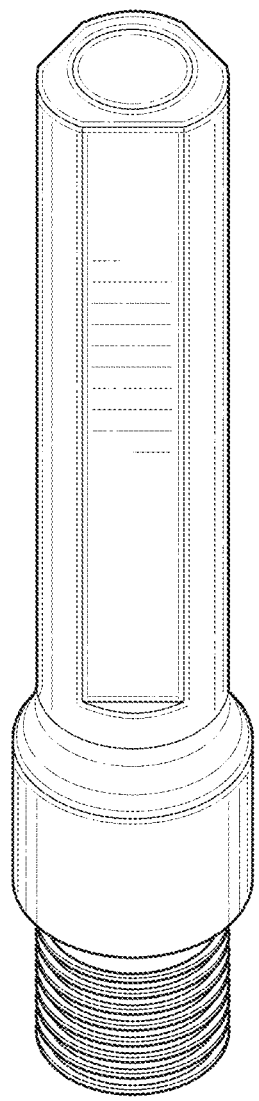
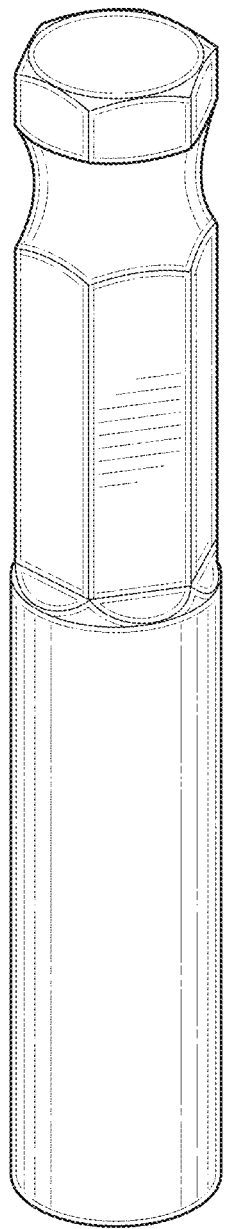
FIG. 8A
FIG. 8B

DRILL CHUCK ASSEMBLY

CROSS REFERENCE TO RELATED APPLICATIONS

This application claims the benefit of U.S. Provisional Application No. 62/198,324 filed on Jul. 29, 2015. The above identified patent application is herein incorporated by reference in its entirety to provide continuity of disclosure.

BACKGROUND OF THE INVENTION

The present invention relates to drill chucks for use with drills or with electric or pneumatic power drivers. More specifically, the present invention relates to a keyless drill chuck assembly having a central bore with a trilobe profile configured to receive a triangular and hexagonally shaped drill bit shank interchangeably and a quick release mechanism configured to receive the drill bit shanks automatically.

There are a variety of different drill chucks involving different tool locking mechanisms. For example, there are jawed chucks, which have many dogs or jaw-like members that are tightened to lock the tool in place. Often the jaws will be tightened or loosened with the help of a chuck key, which is a wrench-like tool made for the purpose of tightening and loosening the shafts of tools in the chuck. However, there are many jawed chucks of the keyless variety, which involve the tightening and loosening of tools therein by hand force alone. Keyless designs offer the convenience of quicker and easier "chucking" and "unchucking," i.e., tightening and loosening the tool in the chuck, but have lower gripping force to hold the tool. Additionally, there are collet chucks, which rather than having jaws, have collets, which are flexible collars or sleeves that fit closely around the tool or workpiece and grip it when squeezed.

When employing the majority of these chucks, however, it is often difficult for a user to quickly change a drill bit for another. For instance, the majority of chucks can neither accept different drill bits, which then requires the changing of the chuck altogether if a different drill bit is required, nor have releasing mechanisms that enable a user to change the drill bit without having to manipulate the chuck with their hands. For instance, the majority of jawed chucks require the use of a chuck key, which is a wrench-like tool requiring a user to insert the key into the chuck and twist and turn the key in order to tighten or loosen the drill bit. Moreover, the majority of chucks are developed to enable only one type of drill bit to be inserted therein. Furthermore, there are instances when a chuck's releasing mechanism is not directly accessible by a user, thereby requiring the user to manipulate the tool more than necessary. These are setbacks that slows a user's work and makes it awkward for him or her to quickly exchange one drill bit shank for another. Thus, there is a need for a drill chuck assembly in which both a triangular and hexagonal drill bit shank may be inserted and secured automatically therein.

SUMMARY OF THE INVENTION

In view of the foregoing disadvantages inherent in the known types of drill chucks now present in the prior art, the present invention provides a drill chuck assembly wherein the same can be utilized for providing convenience for the user when employing a variety of drill bits on one power driver. The present system provides a drill chuck assembly including a body having an upper end, a lower end configured to threadably engage a rotational drive, and a bore extending longitudinally therethrough, the bore including a trilobe configuration configured to interchangeably receive a triangular drill bit shank and a hexagonal drill bit shank, a plurality of slots extending longitudinally along the body, one of the plurality of slots disposed at each lobe of the body, wherein the plurality of slots are in communication with the bore, a collar disposed about the body at the upper end thereof, the collar including an angled wall, wherein the angled wall and the body defined a channel therebetween, the channel including a depth that increases from the upper end towards the lower end, a sleeve slidably positioned along the body, the sleeve longitudinally slidable between a first position and a second position, the sleeve biased to the first position by a spring, the sleeve including a plurality of apertures, wherein each of the plurality of apertures are aligned and in communication with one of the plurality of slots between the first position and the second position, a plurality of detent balls, one of the plurality of detent balls positioned in one of the plurality of apertures and extending into one of the plurality of slots aligned therewith, wherein the plurality of detent balls are slidable along the plurality of slots, the plurality of detent balls including a diameter larger than a width of the plurality of slots, wherein the plurality of detent balls are configured to laterally depress and transition longitudinally along the angled wall when a drill bit shank is inserted into the bore, thereby sliding the sleeve towards the lower end to a locked position in which the depth of the channel is equal to the diameter of the plurality of detent balls, the locked position securing the drill bit shank within the bore via a bias force exerted by the spring, and wherein moving the sleeve to the second position moves the plurality of detent balls to a position in the channel wherein the depth is larger than the diameter of the plurality of detent balls, releasing the drill bit shank.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 8A shows a perspective view of a triangular drill bit.
FIG. 8B shows a perspective view of a hexagonal drill bit.

DETAILED DESCRIPTION OF THE INVENTION

Figure 1:
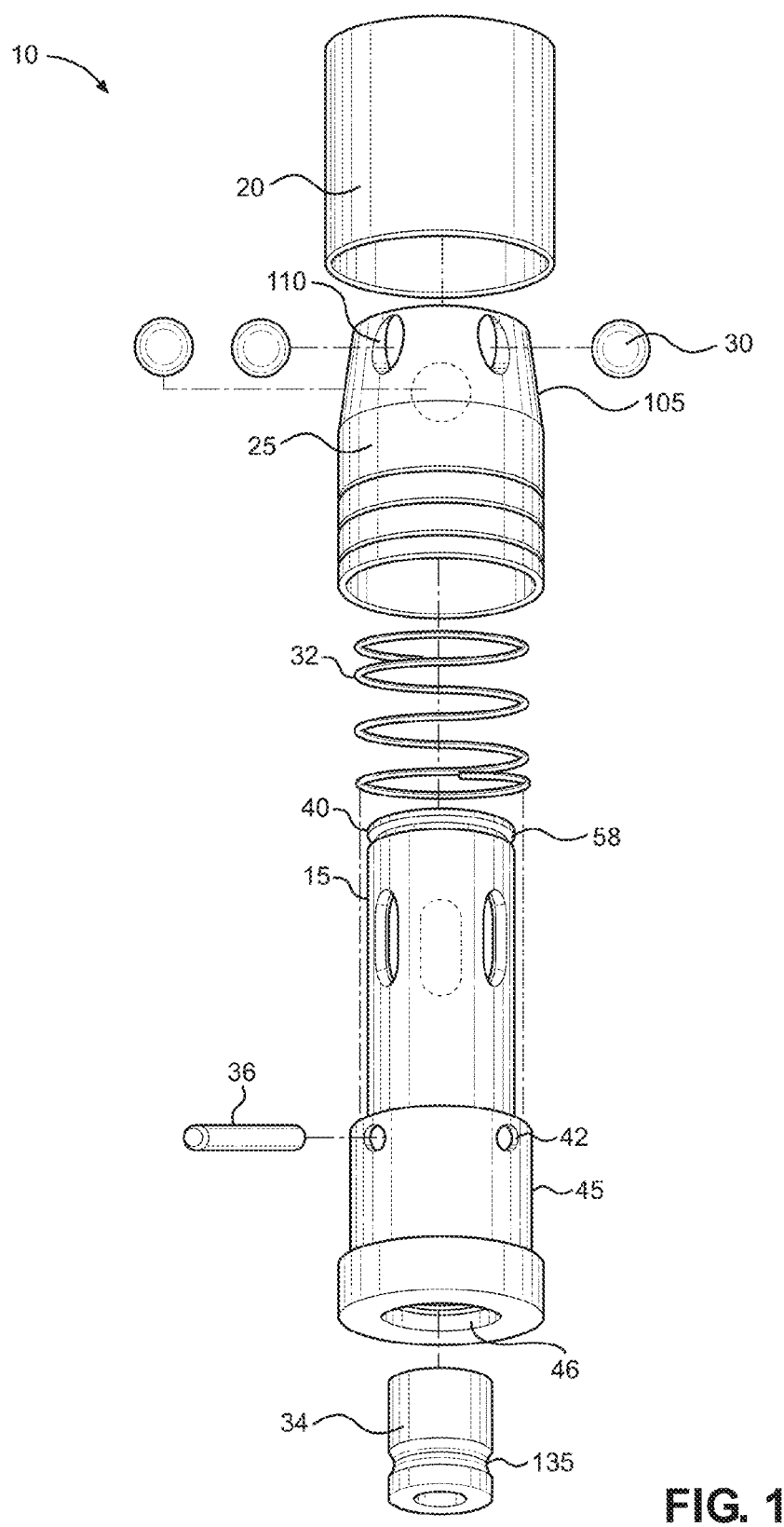
FIG. 1 shows an exploded view of the drill chuck assembly.

Reference is made herein to the attached drawings. Like reference numerals are used throughout the drawings to depict like or similar elements of the drill chuck assembly. The figures are intended for representative purposes only and should not be considered to be limiting in any respect.

Figure 2:
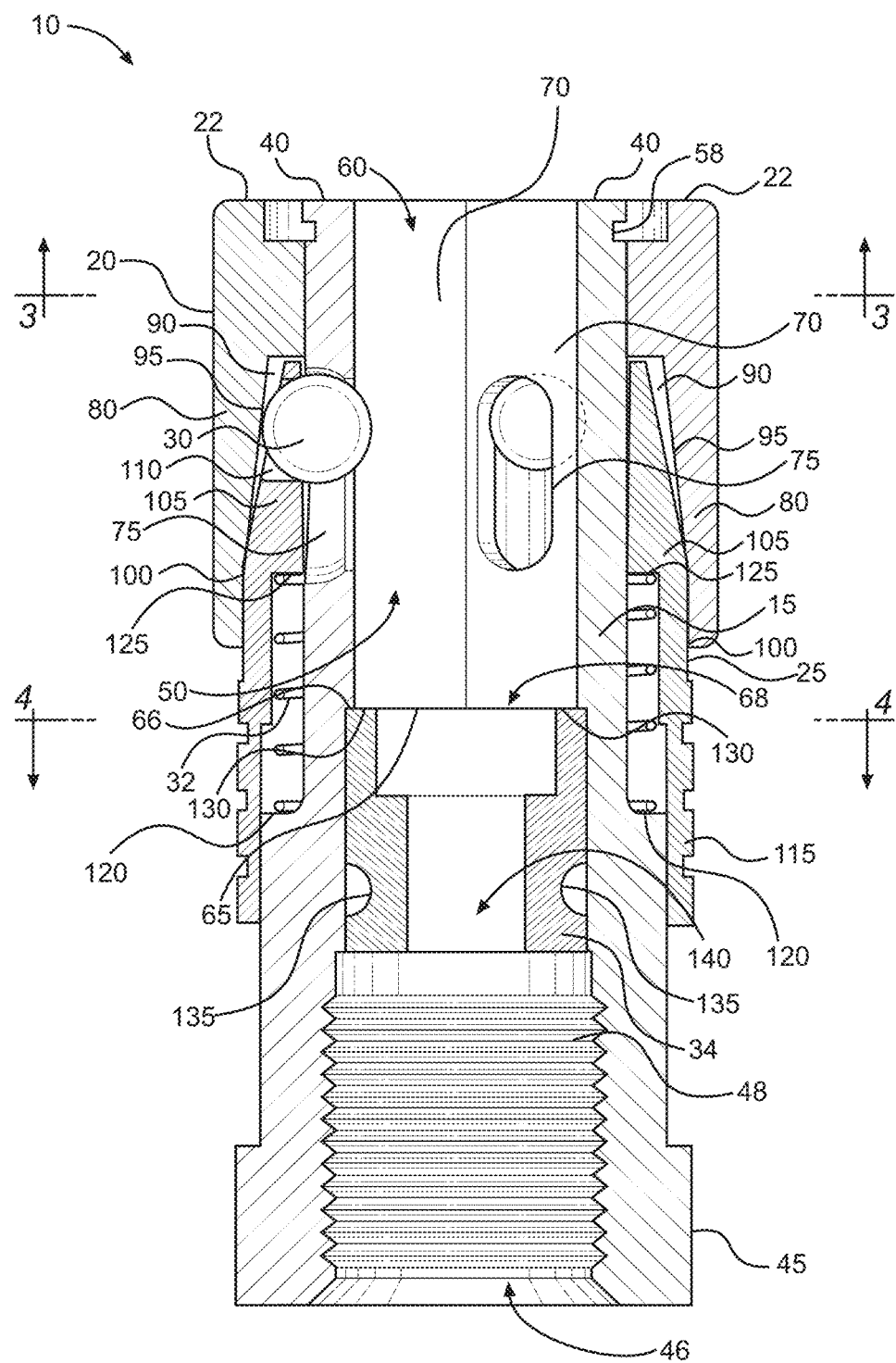
FIG. 2 shows a cross-sectional view of the drill chuck assembly along its longitudinal axis with the drill chuck assembly in its first position.

Referring now to FIGS. 1 and 2, there is shown an exploded view of the drill chuck assembly and a cross-sectional view of the drill chuck assembly along its longitudinal axis, respectively. The present invention comprises a drill chuck assembly 10 configured to receive and retain a drill bit shank. The drill chuck assembly 10 comprises a body 15, a collar 20, a sleeve 25, detent balls 30, a spring 32, a plug 34, and a dowel pin 36.

Figure 3:
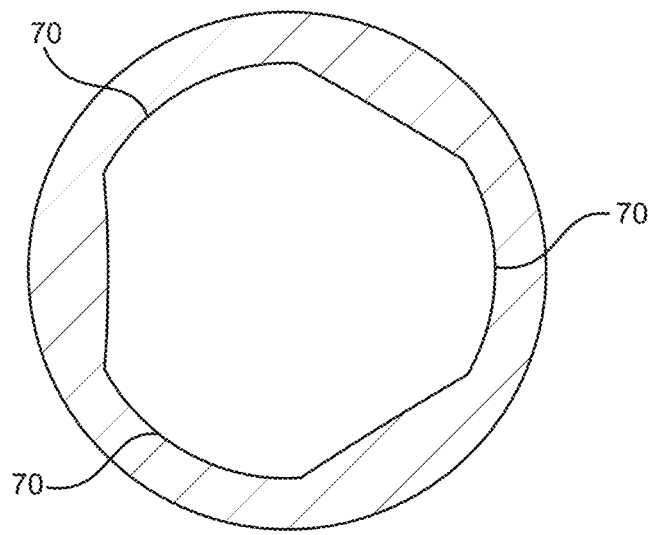
FIG. 3 shows a cross-sectional view of the drill chuck assembly along line 3-3.

The body 15 includes an upper end 40 and a lower end 45. The body 15 comprises a bore 50 having a trilobe profile that is sized and dimensioned to interchangeably receive different types of drill bit shanks, including both triangular drill bit shanks and hexagonal drill bit shanks, as shown in FIGS. 8A-8B. The trilobe profile includes three arcuate sections, i.e. lobes 70, connected together by linear sections defining a roughly trefoil-shaped cross-section, as shown by FIG. 3. The bore 50 extends substantially along the longitudinal axis of the body 15.

The upper end 40 includes a first open end 60 for providing access to the bore 50. The upper end 40 includes a notch 58, which extends annularly around the upper end 40 and is sized to receive a snap ring therein. The upper end 40 is perpendicular relative to the bore 50. The bore 50 terminates in the body 15 at a bottom end 65, which in turn is coupled to the plug 34. The bottom end 65 of the bore includes an opening 68 and a shelf 66 that acts to block the plug 34 when inserted into the lower end 45 of the body from going into the bore 50. The shelf 66 is situated perpendicularly relative to the longitudinal axis of the bore 50. The body 15 includes a tubular channel 42 that extends perpendicularly relative to the longitudinal axis of the body 15. The lower end 45 of the body 15 includes a second open end 46 enabling insertion of the plug 34 therein. The lower end 45 includes a threaded engagement 48 that is configured to threadably couple to an arbor of a rotational drive. In one embodiment, the threaded engagement 48 is sized to threadably receive a variety of differently sized extension shanks having the same thread thereon.

Each lobe 70 includes a slot 75 disposed along the longitudinal axis of the body 15. The slots 75 are positioned in between the upper end 40 and the bottom end 65, such that the upper end 40 is above the slots 75 and the bottom end 65 is below the slots 75. The slots 75 extend entirely though the body 15 such that each slot 75 communicates with the bore 50. The slots 75 are elongated and oblong in shape, such that the detent balls 30 may move along the longitudinal axis of the slots 75 when positioned therein.

The collar 20 is pressedly mounted to the body 15 such that it is disposed annularly therearound. The collar 20 is positioned adjacent to the upper end 40 of the front portion 35, such that its upper surface 22 is aligned with the upper end 40 of the body 15. After the collar 20 is mounted onto the body 15, a snap ring can be inserted into the notch 58 of the body 15 to hold the collar 20 in place and prevent it from becoming loosened or falling off of the body 15. The collar 20 includes a tapered portion 80 that defines a channel 90 that extends annularly around the bore 50. When the collar 20 is secured to the body 15, the channel 90 is disposed around the slots 75. The channel 90 includes an angular wall 95 that terminates at a longitudinal wall 100. The angular 95 extends outwardly towards the bottom end 65 of the bore 50, thereby increasing the depth of the channel 90 towards the bottom end 65, while the longitudinal wall 100 extends from the end of the angular wall 95 towards the bottom end 65 of the body 15, parallel to the body 15. The angular wall 95 is positioned adjacent to the slots 75, such that the angular wall 95 is in communication with the slots 75.

The sleeve 25 is slidably mounted around the body 15 and is disposed annularly therearound. The sleeve 25 includes a tapered end 105, which is slidably disposed within the channel 90 of the collar 20, such that the tapered end 105 can slide along the longitudinal axis of the body 15 and within the channel 90. The tapered end 105 includes circular apertures 110, which correspond and are aligned with the slots 75 of the body 15, such that the apertures 110 are in communication with the slots 75 of the bore 50. The detent balls 30 extend through the circular apertures 110 of the sleeve 25 into the slots 75 of the body 15, which prevents the sleeve 25 from rotating about the body 15. In the depicted embodiment, the sleeve 25 includes a knurled portion 115 which provides a grip for grasping and actuating the sleeve 25.

The detent balls 30 are slidably disposed within the apertures 110 of the sleeve 25 and the slots 75 of the bore 50, which are circumferentially aligned, such that they are positioned within the channel 90 of the collar 20. The collar 20 prevents the detent balls 30 from leaving their position within the channel 90 and completely falling out of the body 15. The diameter of the detent balls 30 is greater than the width of the innermost end of the slots 75 of the body 15, preventing the detent balls 30 from completely passing through the slots 75 into the bore 50 of the body 15.

The spring 32 is disposed between a body shoulder 120 on the body 15 and a sleeve shoulder 125 on the sleeve 25. The spring 32 is a compression spring, whereby the spring 32 compresses as a load or force is applied to the sleeve 25. The spring 32 is biased towards the upper end 40 of the body 15, i.e. the spring 32 exerts a force along the longitudinal axis of the body 15 towards the upper end 40 thereof when compressed. When the sleeve 25 is biased towards the upper end 40, the detent balls 30 in the channel 90 engage the angular wall 95 of the channel 90 and are pushed through the slots 75 of the bore 50, such that the detent balls 30 protrude inwardly towards the center of the bore 50. The sleeve 25 is transitionable along the body 15 between a first position (wherein the spring is extended) and a second position (wherein the spring is entirely compressed). The spring 32 acquires more compression as the sleeve 25 is transitioned from its first position to its second position.

Figure 4:
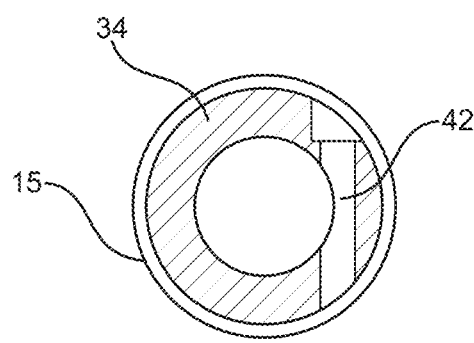
FIG. 4 shows a sectional view of the plug along line 4-4.

The plug 34 is positioned in an interior of the body 15 and disposed annularly around the interior surface thereof. The plug 34 includes a plug shoulder 130 coupled to the bore 50 of the body 15. The plug shoulder 130 is situated perpendicularly relative to the longitudinal axis of the body 15. When a drill bit shank is inserted into the body 15 through the bore 50, the plug shoulder 130 of the plug 34 acts to block the drill bit shank from passing into the opening 68 of the body 15 and allows the drill bit shank to rest thereagainst. The plug 34 has a grove 135 disposed annularly therearound. The plug 34 is configured to be inserted into the lower end 46 of the body 15, as show in FIG. 1, until the plug shoulder 130 reaches the shelf 66 on the bottom end 65 of the body 15. The shelf 66 acts to stop the plug 34 in the interior of the body 15 and to prevent it from moving into the bore 50. When the plug 34 is inserted into the body 15 the groove 135 is aligned with the tubular channel 42 of the body 15, such that the groove 135 is in communication with the tubular channel 42. The channel 42 is configured to receive a dowel pin 36 therethrough, such that the dowel pin 36 extends across the body 15 into the groove 135, fastening the plug 34 in place within the body 15. The plug 34 further includes a bore 140 that extends longitudinally through the plug 34. The tubular channel 42 of the body 15 is offset from the bore 140 of the plug 34, as shown by FIG. 4, such that when the dowel pin 36 is inserted through the channel 42, the dowel pin 36 does not extend through the bore 140.

FIG. 2 illustrates a view of the drill chuck assembly in its first position prior to insertion of a drill bit shank into the bore 50. The drill check assembly 10 stays in the first position until a shank 200 comes into contact with the detent balls 30 as the shank 200 enters the bore 50. The drill chuck assembly 10 maintains its first position when resting because the spring 32 is biased to push the sleeve 25 longitudinally towards the upper end 40 of the body 15. As the detent balls 30 rest within the apertures 110 of the sleeve, the action of the spring 32 on the sleeve 25 causes the sleeve 25 to push the detent balls 30 through the channel 90 and along the slots 75 of the bore 50. As the detent balls 30 are transitioned through the channel 90, the detent balls 30 make contact with the angular wall 95 of the collar 20, which in turn pushes the detent balls 30 laterally inwardly towards the center of the bore 50 until the detent balls 30 reach the terminus of the slots 75. When the detent balls 30 reach the terminus of the slots 75 in which they are positioned, the detent balls 30 thereby prevent the sleeve 25 from moving further towards the upper end 40 of the body 15. In the first position the detent balls 30 are in their most inwardly protruding position. The detent balls 30 are prevented from passing through the slots 75 into the bore 50 because the diameter of the detent balls 30 is larger than the width of the slots 75.

Figure 5:
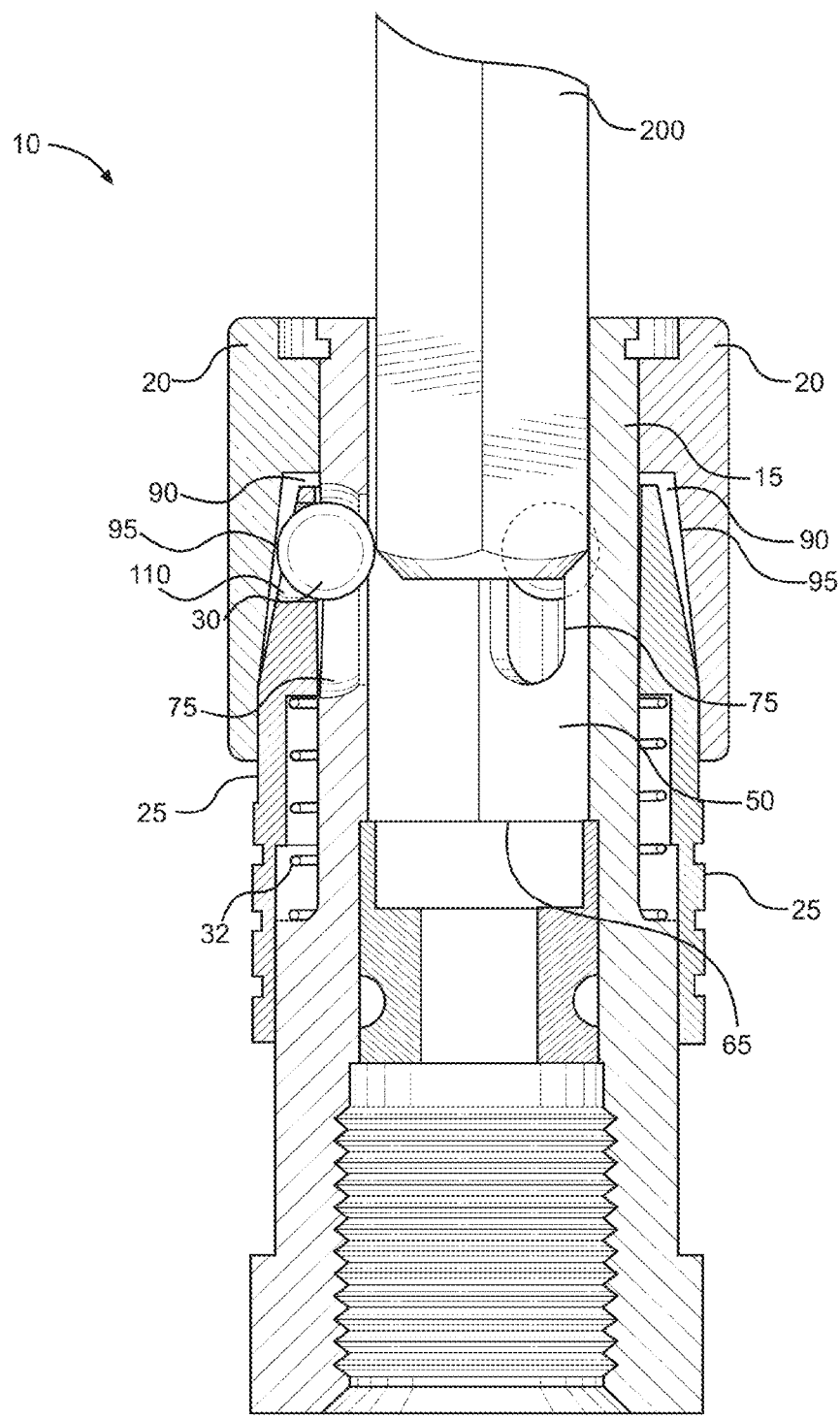
FIG. 5 shows a cross-sectional view of the drill chuck assembly along its longitudinal axis as a drill bit shank is inserted into the bore.

Referring now to FIG. 5, there is shown a cross-sectional view of the drill chuck assembly along its longitudinal axis as a drill bit shank is inserted into the bore. As a shank 200 is inserted into the bore 50 of the drill bit assembly 10, the shank 200 makes contact with the detents balls 30, which protrude inwardly into the bore 50 when the drill chuck assembly is in its first position. The shank 200 in turn exerts a lateral force on the detent balls 30, which pushes the detent balls 30 laterally outwardly relative to the bore 50 along the angular wall 95 of the collar 20. As the detent balls 30 move along the angular wall 95, the detent balls 30 move downwardly along their respective slots 75 within the apertures 110 of the sleeve 25 towards the bottom end 65 of the body 15. As the width of the channel 90 increases towards the bottom end 65 due to the angular wall 95 being angled away from the bore 50, the detent balls 30 are permitted to move laterally. The movement of the detent balls 30 along the angular wall 95 in turn causes the sleeve 25 to slide towards the bottom end 65 of the body 15, compressing the spring 32.

Figure 6:
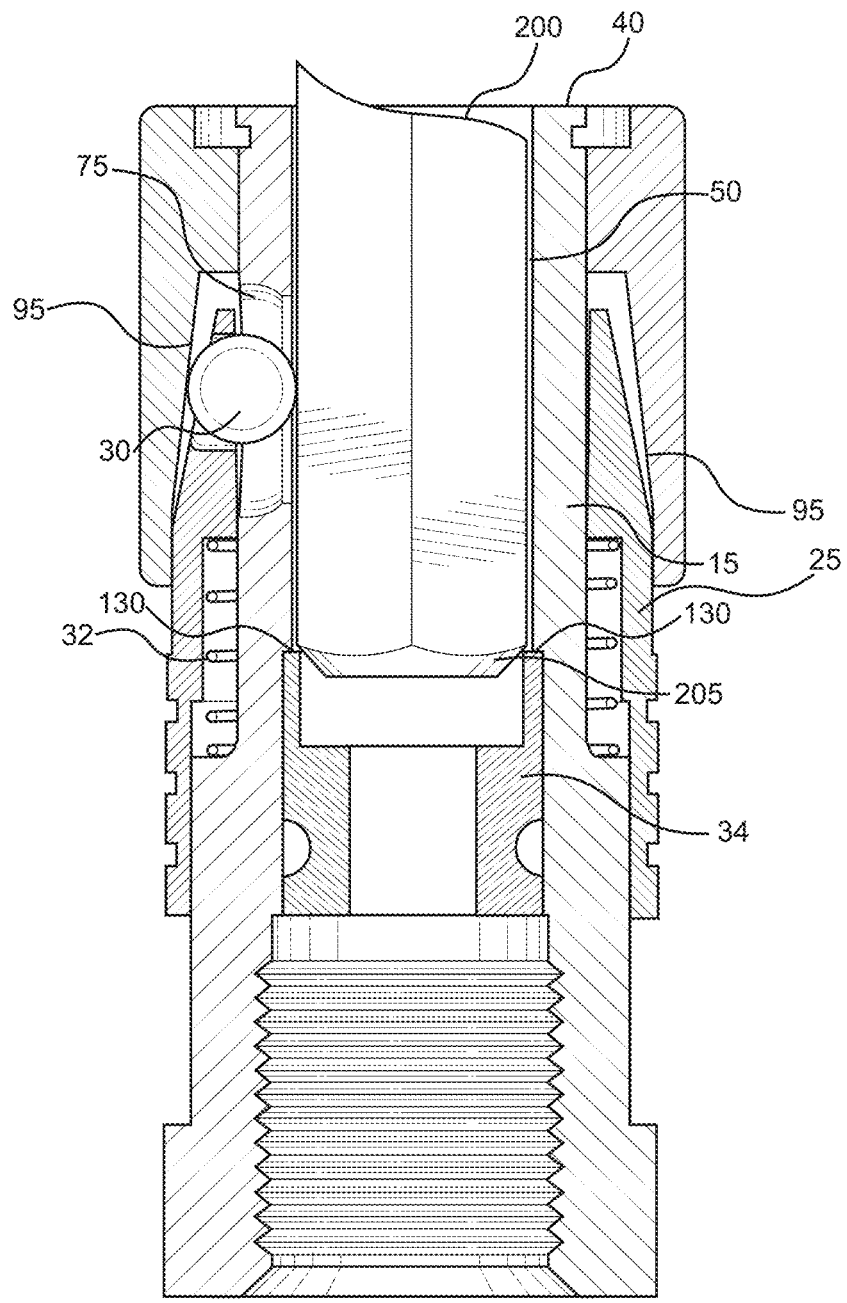
FIG. 6 shows shown a cross-sectional view of the drill chuck assembly along its longitudinal axis after a drill bit shank has been inserted into the bore and is locked therein.

Referring now to FIG. 6, there is shown a cross-sectional view of the drill chuck assembly along its longitudinal axis after a drill bit shank has been inserted into the bore and is locked therein. The shank 200 can progress into the bore 50 until the end 205 of the shank 200 makes contact with the plug shoulder 130 of the plug 34. The plug 34 thereby dictates the depth to which the shank 200 can extend into the bore 50. When the shank 200 is fully inserted into the bore 50, i.e. the end 205 of the shank 200 makes contact with the plug shoulder 130 of the plug 34, the detent balls 30 are held in place against the shank 200 by the longitudinal force exerted by the compressed spring 32, which is biased to press the sleeve 25 towards the upper end 40 of the body 15. The longitudinal force exerted by the compressed spring 32 forces the sleeve 25, and thus likewise the detent balls 30, to a locked position, i.e., the farthest position along the slots 75 and towards the upper end 40 that is permitted by the distance between the angular wall 95 and the surface of the shank 200. The spring 32 thereby exerts a bias force on the shank 200 via the angular wall 95 and each of the detent balls 30, thereby locking the shank 200 in place within the bore 50.

Figure 7:
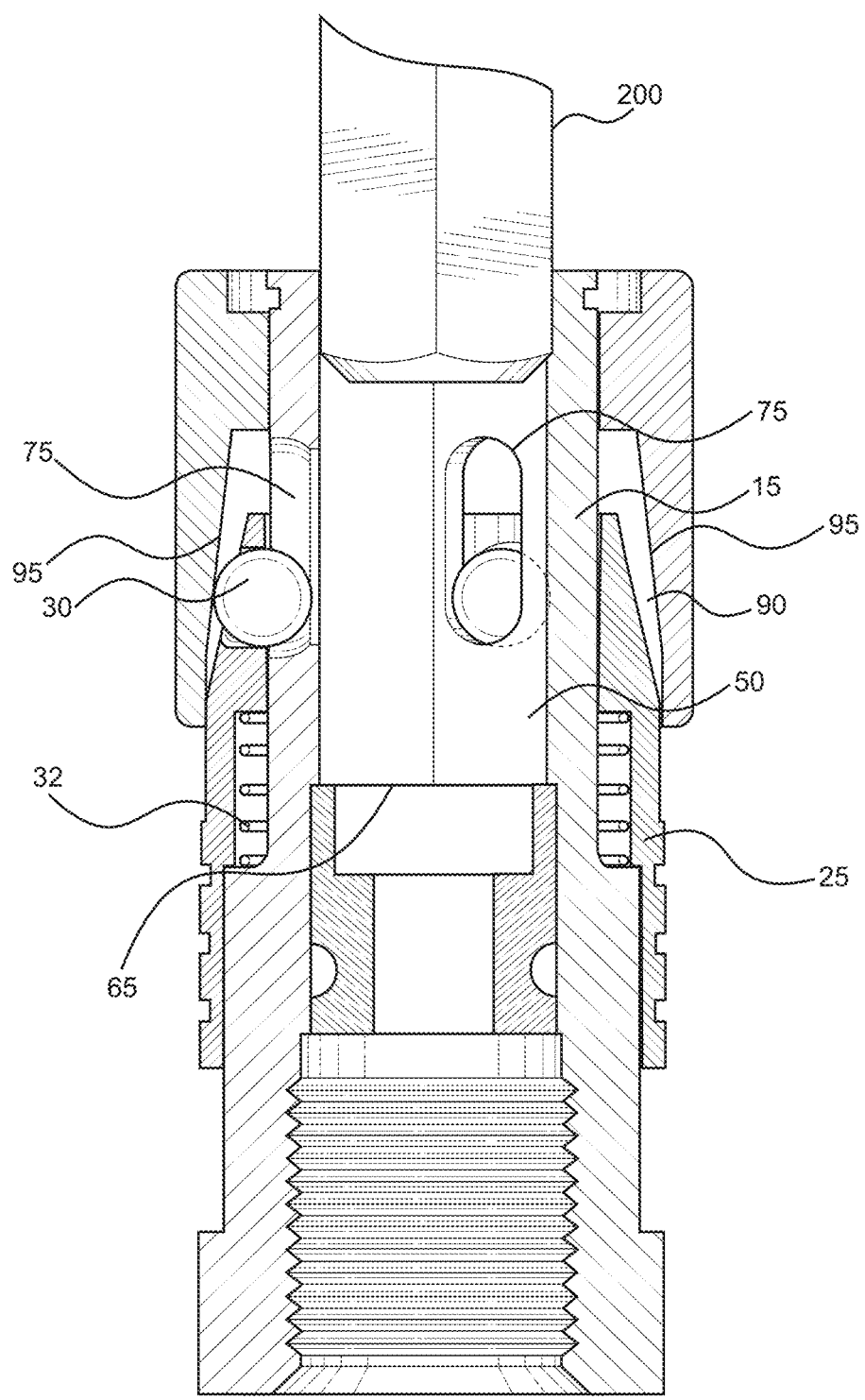
FIG. 7 shows a cross-sectional view of the drill chuck assembly along its longitudinal axis while in its second position, thereby allowing removal of a drill bit shank from the bore.

Referring now to FIG. 7, there is shown a cross-sectional view of the drill chuck assembly along its longitudinal axis while in its second position, thereby allowing removal of a drill bit shank from the bore. To remove a drill bit shank 200 from the bore 50, the sleeve 25 is moved downwardly along the body 15 towards the bottom end 65 of the body 15 and against the bias force of the spring 32, thereby compressing the spring 32. As the sleeve 25 is moved downwardly along the body 15, the detent balls 30 are permitted to move laterally within the slots 75 due to the increasing depth of the channel 90. When the distance between the angular wall 95 and the shank 200, i.e., the depth, is larger than the diameter of the detent balls 30, the lateral force exerted on the drill bit shank 200 by the detent balls 30 is removed, thereby unlocking the shank 200 and allowing the shank 200 to be removed from the bore 50.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A drill chuck assembly comprising:
   a body including an upper end, a lower end configured to threadably engage a rotational drive, and a bore extending longitudinally therethrough;
   the bore including a trilobe configuration configured to interchangeably receive a triangular drill bit shank and a hexagonal drill bit shank;
   a plurality of slots extending longitudinally along the body, one of the plurality of slots disposed at each lobe of the body;
   wherein the plurality of slots are in communication with the bore;
   a collar disposed about the body at the upper end thereof, the collar including an angled wall;
   wherein the angled wall and the body defined a channel therebetween, the channel including a depth that increases from the upper end towards the lower end;
   a sleeve slidably positioned along the body, the sleeve longitudinally slidable between a first position and a second position;
   the sleeve biased to the first position by a spring;
   the sleeve including a plurality of apertures, wherein each of the plurality of apertures are aligned and in communication with one of the plurality of slots between the first position and the second position;

a plurality of detent balls, one of the plurality of detent balls positioned in one of the plurality of apertures and extending into one of the plurality of slots aligned therewith;

wherein the plurality of detent balls are slidable along the plurality of slots;

the plurality of detent balls including a diameter larger than a width of the plurality of slots;

wherein the plurality of detent balls are configured to laterally depress and transition longitudinally along the angled wall when a drill bit shank is inserted into the bore, thereby sliding the sleeve towards the lower end to a locked position in which the depth of the channel is equal to the diameter of the plurality of detent balls;

the locked position securing the drill bit shank within the bore via a bias force exerted by the spring;

wherein moving the sleeve to the second position moves the plurality of detent balls to a position in the channel wherein the depth is larger than the diameter of the plurality of detent balls, releasing the drill bit shank;

a plug mounted in an interior of the body, the annular plug including a bore extending longitudinally therethrough and a groove disposed annularly around the plug; and a tubular channel extending perpendicularly through the body relative to the longitudinal axis of the body, the tubular channel being offset from the bore of the plug and aligned with the groove such that they are in communication, the tubular channel and groove configured to receive a dowel pin therethrough.

2. The drill chuck assembly of claim 1, wherein the plug further comprises a plug shoulder coupled to a bottom end of the bore, the plug shoulder being perpendicular relative to the longitudinal axis of the bore and configured to block the drill bit shank from being further inserted into the bore towards the lower end of the body.

3. The drill chuck assembly of claim 1, wherein the bore of the body further includes a shelf disposed on a bottom end of the bore, the shelf being perpendicular relative to the longitudinal axis of the bore and configured to block the plug when mounted therein from being further inserted into the bore towards the upper end of the body.

4. The drill chuck assembly of claim 1, wherein the upper end of the body further comprises a notch disposed annularly therearound, the notch configured to receive a snap ring.

5. The drill chuck assembly of claim 1, wherein the sleeve further comprises a knurled portion.

6. The drill chuck assembly of claim 1, wherein the body further comprises a body shoulder and the sleeve comprises a second shoulder.

7. The drill chuck assembly of claim 6, wherein the spring is positioned between the body shoulder and the sleeve shoulder.

* * * * *